(12) United States Patent
Amer et al.

(10) Patent No.: US 8,116,372 B1
(45) Date of Patent: Feb. 14, 2012

(54) DATA STRUCTURE AND METHOD USING SAME FOR ENCODING VIDEO INFORMATION

(75) Inventors: Ihab Amer, Cairo (EG); Toader-Adrian Chirila-Rus, Austin, TX (US); Robert D. Turney, Watertown, WI (US); Wilson C. Chung, Menlo Park, CA (US); Wael Badawy, Calgary (CA)

(73) Assignee: Xilinx, Inc., San Jose, CA (US)

( * ) Notice: Subject to any disclaimer, the term of this patent is extended or adjusted under 35 U.S.C. 154(b) by 1145 days.

(21) Appl. No.: 11/977,894

(22) Filed: Oct. 26, 2007

(51) Int. Cl.
*H04N 7/12* (2006.01)
(52) U.S. Cl. ............................... 375/240.01; 375/240.26
(58) Field of Classification Search .......................... None
See application file for complete search history.

(56) References Cited

U.S. PATENT DOCUMENTS

| 5,691,768 | A | * | 11/1997 | Civanlar et al. ........... | 375/240.01 |
| 6,075,556 | A | * | 6/2000 | Urano et al. .................... | 348/43 |
| 7,711,049 | B2 | * | 5/2010 | Zhou et al. ............... | 375/240.16 |
| 2005/0084007 | A1 | * | 4/2005 | Lightstone et al. ...... | 375/240.03 |
| 2005/0152451 | A1 | * | 7/2005 | Byun, II ................... | 375/240.03 |
| 2005/0195275 | A1 | * | 9/2005 | Lia et al. .................... | 348/14.13 |

OTHER PUBLICATIONS

D. Wu, S. Wu, K. Lim, F. Pan, Z. Li, X. Lin, "Block INTER mode decision for fast encoding of H.264", 2004 IEEE International Conference on Acoustics, Speech, and Signal Processing.
S. Lin, C. Chang, C. Su, Y. Lin, C. Pan, and H. Chen "Fast Multi-Frame Motion Estimation and Mode Decision for H.264 Encoders", 2005 IEEE International Conference on Wireless Networks, Communications and Mobile Computing.
A. Yu and G. Martin, "Advanced Block Size Selection Algorithm for Inter Frame Coding in H.264/MPEG-4 AVC", 2004 IEEE International Conference on Image Processing.
A. Yu, "Efficient Block-Size Selection Algorithm for Inter-Frame Coding in H.264/MPEG-4 AVC", 2004 IEEE International Conference on Acoustics, Speech, and Signal Processing.
H. Tourapis and A. Tourapis "Fast Motion Estimation within the H.264 CODEC", 2003 IEEE International Conference on Multimedia and Expo, vol. 3, Jul. 2003, pp. 517-520.
P. Yin, H. Tourapis, A. Tourapis, and J. Boyce, "Fast Mode Decision and Motion Estimation for JVTIH.264", 2003 IEEE International Conference on Image Processing.
X Lu, A. Tourapis, P. Yin, and J. Boyce, "Fast Mode Decision and Motion Estimation for H.264 with a Focus on MPEG-2/H.264 Transcoding", 2005 IEEE International Symposium on Circuits and Systems, vol. 2, May 2005, pp. 1246-1249.
J. Lee and B. Jeon, "Fast mode decision for H.264", 2004 IEEE International Conference on Multimedia and Expo.

(Continued)

*Primary Examiner* — Hong Cho
(74) *Attorney, Agent, or Firm* — W. Eric Webostad; Gerald Chan

(57) ABSTRACT

A data structure and method of use thereof for encoding video information are described. Macroblock parameters are initialized, and it is determined whether an operating point is selected. If the operating point is selected, then the following occurs: each quad of nodes of a first node level are obtained and a check for merger is done on them; each quad of nodes of a second node level is obtained and a check for merger is done on them; nodes of a third node level are obtained and check for merger is done on them; nodes of a fourth node level are obtained and a check for merger is done on them; and modes are assigned responsive to cost of combinations of encoding modes associated with possible mergers.

20 Claims, 8 Drawing Sheets

OTHER PUBLICATIONS

A. Ahmad, N. Khan, S. Masud, and M.A. Maud, "Efficient Block Size Slection in H.264 Video Coding Standard", IEE Electronics Letters, vol. 40, No. 1, Jan. 2004, pp. 19-21.

Y.-H. Kim, J.-W. Yoo, S.-W. Lee, J. Shin, J. Paik, and H.-K. Jung, "Adaptive Mode Decision for H.264 Encoder", IEE Electronics Letters, vol. 40, No. 19, Sep. 2004,pp. 1172-1173.

Y. Jiang, S. Li, and S. Goto, "A Low Complexity Variable Block Size Motion Estimation Algorithm for Video Telephony Communication", 2004. MWSCAS '04. The IEEE 2004 47th Midwest Symposium on Circuits and Systems, vol. 2 Jul. 25-28, 2004 pp. II-465-8 vol. 2, Digital Object Identifier 10.1109/MWSCAS.2004.1354195.

A. Tanizawa, S. Koto, T. Chujoh, and Y. Kikuchi "A Study on Fast RateDistortion Optimized Coding Mode Decision for H.264", 2004 IEEE International Conference on Image Processing.

Q. Dai, D. Zhu, and R. Ding, "Fast Mode Decision for Inter Prediction in H.264", 2004 IEEE International Conference on Image Processing.

C.-H. Kuo, M. Shen, and C.-C. Kuo. "Fast Inter-Prediction Mode Decision and Motion Search for H.264", 2004 IEEE International Conference on Multimedia and Expo.

Q. Chen and Y He, "A Fast Bits Estimation Method for Rate-Distortion Optimization in H.264/AVC", 2004 Picture Coding Symposium, Dec. 15-17, 2004, San Francisco, CA, USA.

I. Rhee, G.R. Martin; S. Muthukrishnan, and R.A. Packwood, "QuadtreeStructured Variable-Size Block-Matching Motion Estimation with Minimal Error", IEEE Transactions on Circuits and Systems for Video Technology, vol. 10, No. 1, Feb. 2000, pp. 42-50.

Y-K. Tu, J.F. Yang, Y-N. Shen and M.-T. Sun, "Fast Variable-Size Block Motion Estimation Using Merging Procedure with an Adaptive Threshold", 2003 IEEE International Conference on Multimedia and Expo.

Z. Zhou, M.-T. Sun, and Y.-F. Hsu,"Fast Variable Block-Size Motion Estimation Algorithms Based on Merge and Split Procedures for H.264/MPEG-4 AVC", 2004 IEEE International Symposium on Circuits and Systems.

Z. Zhou and M.-T. Sun, "Fast Macroblock Inter Mode Decision and Motion Estimation for H.264/MPEG-4 AVC", 2004 International Conference on Image Processing.

H.F. Ates and Y Altunbasak, "SAD Reuse in Hierarchical Motion Estimation for the H.264 Encoder", 2005 IEEE International Conference on Acoustics, Speech, and Signal Processing.

Y.-W. Huang, T.-C. Wang, B.-Y. Hsieh, and L.-G. Chen, "Hardware Architecture Design for Variable Block Size Motion Estimation in MPEG-4 AVC/JVT/ITU-T H.264", 2003 IEEE International Symposium on Circuits and Systems.

J. Lee and N. Lee, "Variable Block Size Motion Estimation Algorithm and its Hardware Architecture for H.264/AVC", 2004 IEEE International Symposium on Circuits and Systems, vol. 3., May 2004, pp. 741-744.

L. Zhang and W. Gao, "Improved FFSBM Algorithm and its VLSI Architecture for Variable Block Size Motion Estimation ofH.264", 2005 International Symposium on Intelligent Signal Processing and Communication Systems, Dec. 2005, pp. 445-448.

C.-M. Ou, C.-F. Le, and W.-J. Hwang "An Efficient VLSI Architecture for H.264 Variable Block Size Motion Estimation", IEEE Transactions on Consumer Electronics, vol. 51, No. 4, Nov. 2005, pp. 1291-1299.

C.-Y Cho, S.-Y. Huang, J.-N. Hwang, and J.-S. Wang, "An Embedded Merging Scheme for VLSI Implementation ofH.264/AVC Motion Estimation Modules", 2005 IEEE International Conference on Image Processing, vol. 3, Sep. 2005, pp. 1016-1019.

M. Sayed, I. Amer, and W. Badawy, "Towards an H.264/AVC Full Encoder on Chip: An Efficient Real-Time VBSME ASIC Chip", 2006 IEEE International Symposium on Circuits and Systems.

Amer, Ihab et al. "An Effcent Vaiable Block Size Selection Scheme for the H.264 Motion Estimation", Dec. 27-29, 2006, 5 pgs. The 6th International Workshop on System-on-Chip for Real-Time Applications.

* cited by examiner

```
D_MV_x = abs(MV_x1 - MV_x2);     ~501
D_MV_y = abs(MV_y1 - MV_y2);     ~502 n_semi_iden_MV = 0;              ~503
If ((D_MV_x <= Th_x) && (D_MV_y <= Th_y)){    ~505
    semi_identical = true;       ~504
    n_semi_iden_MV++;            ~507
    }
Else
    semi_identical = false;      ~506
```

```
If (0<QP<12)      merge = ((n_semi_iden_MV >12)?true:false);    ~601
Else if (13<QP<25) merge = ((n_semi_iden_MV>9)?true:false);     ~602
Else if (26<QP<38) merge = ((n_semi_iden_MV >6)?true:false);    ~603
Else              merge = ((n_semi_iden_MV__MV>3)?true:false);  ~604
```

DATA STRUCTURE AND METHOD USING SAME FOR ENCODING VIDEO INFORMATION

FIELD OF THE INVENTION

One or more aspects of the invention relate generally to encoding and, more particularly, to a data structure and method using same for encoding video information.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

The ITU-T Video Coding Experts Group ("VCEG") developed what is known as the H.264 specification, and the ISO/IEC Moving Picture Experts Groups ("MPEG") developed what is known as the MPEG-4 Part 10 specification. These two specifications are maintained such that they have identical technical content under a collective partnership effort known as the Joint Video Team ("JVT").

The H.264 specification proposes use of Variable Block Size ("VBS") Motion Estimation ("ME") and Mode Decision ("MD"). The use of VBS for ME and VBS for MD reduces Rate Distortion ("RD") by allowing more active regions to be represented with more bits than less active regions. This enhancement in performance is in comparison with, for example, a fixed-size ME or fixed-size MD. However, VBS ME/MD heretofore has had a significant increase in H.264 encoder complexity. Because of the significant complexity associated with implementing VBS ME/MD in hardware, it made such hardware implementations impractical for many applications. In particular, the complexity associated with an encoder implemented in hardware for satisfying real-time constraints, in particular real-time high-definition encoding, was a significant limitation on use of VBS ME/MD.

To further complicate matters, the H.264 reference software, known as the Joint Model ("JM") software, employs a brute force approach for implementing VBS ME/MD. For example, for VBS ME, all seven types of ME searches are performed, and an exhaustive search is performed to choose a best partitioning scheme among all possible combinations, namely among all possible MDs.

Accordingly, it would be desirable and useful to reduce the overall encoder complexity with minimal quality degradation for a wide range of bit rates.

SUMMARY OF THE INVENTION

One or more aspects of the invention generally relate to encoding and, more particularly, to a data structure and method using same for encoding video information.

An aspect of the invention relates generally to a data structure, including: N node levels for N a positive integer greater than two; N−1 decision levels being respectively interspersed between the node levels, where the decision levels and the node levels have a hierarchical arrangement; a first node level of the node levels having first nodes and being a lowermost node level, where the first nodes map an area divided up into M for M a positive integer equal to a number of the first nodes and are capable of mapping the area once over; first pairs of the first nodes respectively provided as input to first rules, where the first rules are of a first decision level of the decision levels; a second node level of the node levels having second nodes formed by respectively merging the first nodes of the first pairs responsive to the first rules, where the second nodes are capable of mapping the area once over; second pairs of the second nodes respectively provided as input to second rules, where the second rules are of a second decision level of the decision levels and where the second pairs are formed of a subset of all possible ones of the second nodes for being capable of mapping the area once over; and a third node level of the node levels having third nodes formed by respectively merging the second nodes of the second pairs responsive to the second rules. The second pairs are one quarter as many as the first pairs. The third nodes capable of mapping the area once over.

Another aspect of the invention relates generally to a method for encoding video information, including: initializing macroblock parameters; determining if a first operating point is selected; and if the first operating point is selected, then performing checks for merging as follows: first checking each quad of nodes of a first node level for merger; second checking each quad of nodes of a second node level for merger; third checking of nodes of a third node level for merger; and fourth checking of nodes of a fourth node level for merger. Modes are assigned responsive to cost of combinations of encoding modes associated with possible mergers identified at one or more of the first checking, the second checking, the third checking, and the fourth checking.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
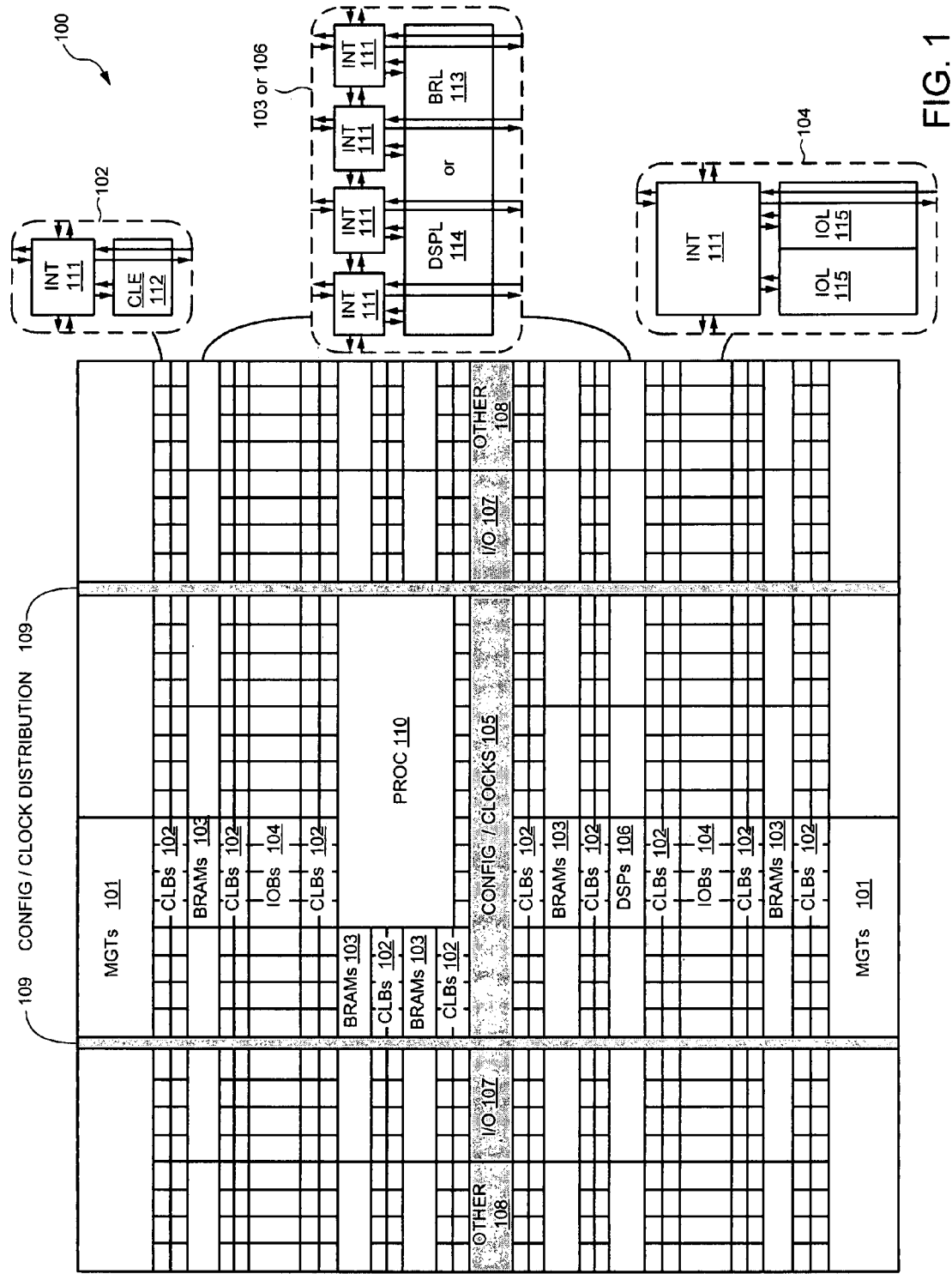
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 or Virtex™-5 FPGA from Xilinx of San Jose, Calif.

As described below in additional detail, a algorithm, which may be implemented in software or hardware, including without limitation a combination thereof, is described. While the following description is in terms of the H.264 specification, it should be appreciated that it also applies to the MPEG-4 Part 10 specification. Furthermore, although these two particular types of video coding specifications are mentioned, it should be appreciated that other known types of video coding may be used. It will be appreciated that the VBS ME/MD algorithm described herein reduces overall encoder complexity to approximately less than half of an encoder implementing conventional VBS ME/MD. More particularly, the overall encoder complexity may be reduced to approximately less than half of a conventional encoder by reducing the number of ME searches and simplifying the MD operation in accordance with the algorithm described herein. Considering for example that one search of one type (e.g., 8×8 pixel search type) is of norm(x) complexity, then a maximum complexity attributed to a merging tree 200 of FIG. 2A may generally be characterized as having a 7× computational complexity. Along those lines, this may be indicated as a VBS type of complexity, namely a VBS 7× complexity. This maximum complexity for ME searching may be reduced by use of a merging tree with interpolating one or more node levels thereof, as described below in additional detail. In the following description, several architectures for different operating points of application of the merging tree are described herein. Each of these architectures reduces complexity by including at least one interpolated or predicted level and is applicable to any known type of ME search. Image quality depends upon the accuracy of the predicted decision or level.

However, even though a significant reduction in encoder complexity may be achieved, it should be appreciated that there is not a significant impact in image quality. More particularly, degradation in image quality need not exceed a 0.2 decibel ("dB") boundary for any conventional bit rate. Conventionally, degradation in image quality between 0.5 and 1 dB may be acceptable, so degradation of less than one-half of a dB, and even more so less than one-fifth of a dB, may generally be acceptable. Moreover, in some instances, an implementation of the algorithm described herein may operate for practical purposes with effectively equal image quality with respect to an implementation of the conventional JM reference software. This is in part because a significant number of people are not visually sensitive to Peak Signal-to-Noise Ratio ("PSNR") deviations below 0.2 dB.

It should further be understood from the following description that although particular numerical examples are shown for purposes of clarity by way of example and not limitation, the algorithm described herein may be used for any number of node levels with a significant reduction in computational complexity though with a minor loss in quality. Furthermore, in comparison to the JM reference software, RD performance is approximated by an implementation of the algorithm described herein, and implementation of the algorithm described herein may reduce overall encoding time to less than half that associated with the brute force search used by the JM reference software.

The algorithm described herein may be implemented partially or entirely with an FPGA, such as FPGA 100 of FIG. 1, using at least in part programmable logic.

Figure 2A:
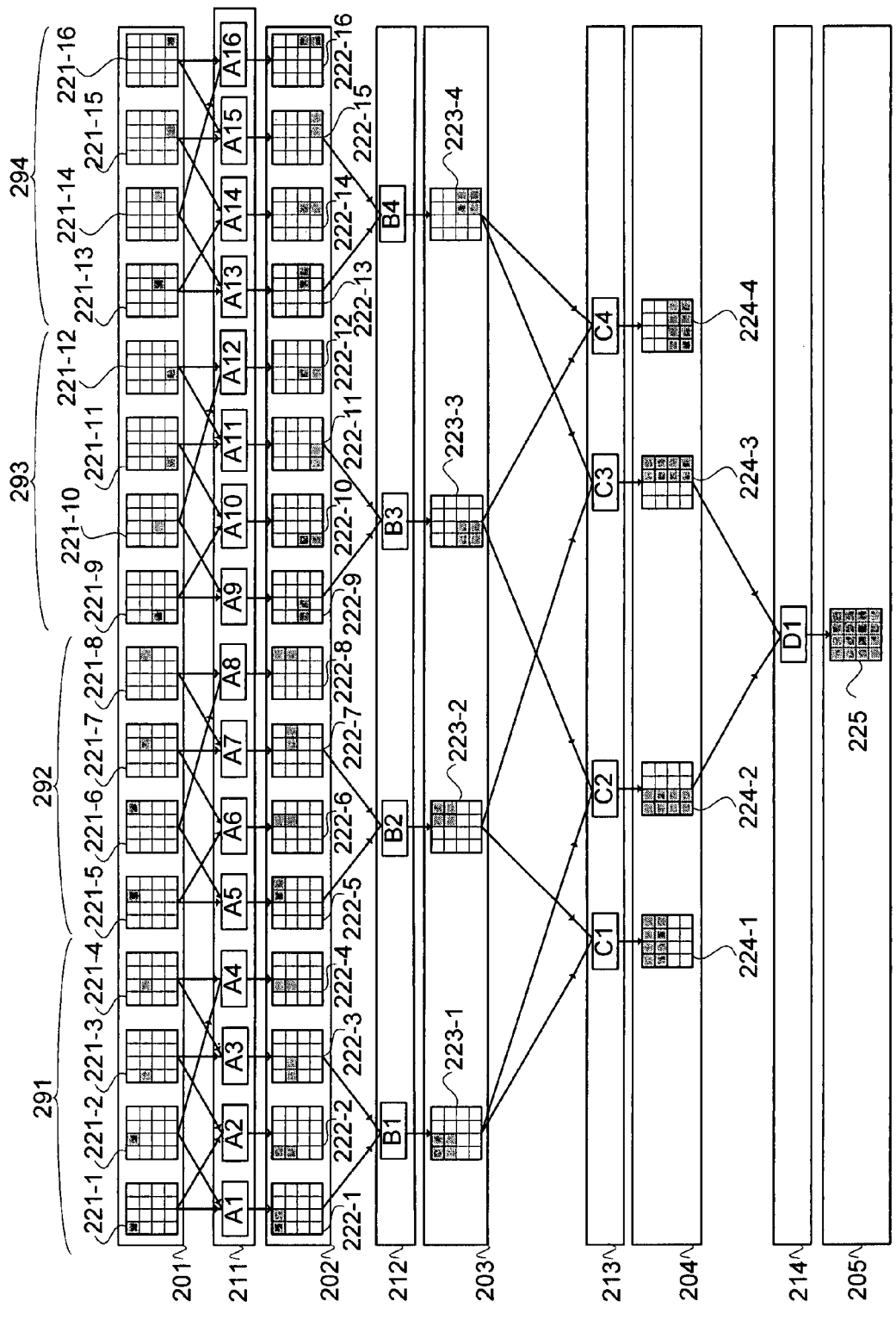
FIGS. 2A through 2D are respective block diagrams depicting an exemplary embodiment of a data structure/decision tree for various operating points.

FIG. 2A is a block diagram depicting an exemplary embodiment of a data structure/decision tree 200. Data structure/decision tree 200 may be thought of as a merging tree 200 for selecting motion vectors. Performance of merging tree 200 may be the same as doing a complete block-based exhaustive search as in the above-referenced conventional JM implementation.

Generally, "suitable" neighboring nodes are selected for merging toward a latter stage. This issue of availability may be associated with a "cost" function. For example, if the cost of a parent block is higher than the sum of costs of child blocks associated with such parent block, then a portion of the larger block-size modes may be excluded. This is described in additional detail with reference to FIG. 3.

For merging tree 200 to be valid, inputs of at least a top node level, such as node level 201, are obtained from an ME search. Any addition of subsequent searches at one or more subsequent node levels may improve the decision, and hence may improve image quality. For example, searches performed for node level 201 may be used to determine any block size, or more generally encoding mode. If node level 202 is predicted and not searched, and then additional searches are performed for node level 203, the prediction error associated with prediction of node level 202 becomes less significant. Even though error accumulates with each additional node level which is predicted, by for example inserting a searched node level between predicted node levels or following a predicted node level, the chain of error accumulation is broken. If for example searches at a node level are assumed exact or ideal, then inserting a searched node level between predicted node levels would effectively break the chain of error accumulation in two.

More particularly, merging tree 200 includes decision levels 211 through 214 and node levels 201 through 205. It should be further appreciated that fewer or more levels than those illustratively shown may be used. Between each pair of adjacent node levels is a decision level.

It should be appreciated that merging is directed toward a parent node from child nodes. Thus, merging upwards toward a parent node 225 starts from child nodes 221-1 through 221-16. Though this is referred to as an upward merging, it should be appreciated that as illustratively shown merging tree 200 is inverted. As shall become further appreciated, some merges are not performed.

Each node level 201 through 205 indicates a sub-blocks and blocks for a macroblock. These sub-blocks and blocks are commensurate with known block partitioning, namely they do not violate known block boundaries. For example, each macroblock, such as macroblock 225, is made up of four eight-by-eight blocks, such as eight-by-eight blocks 223-1 through 223-4. Block boundaries associated with blocks 223-1 through 223-4 mapping to macroblock 225 may not be straddled by a block, and thus it should be appreciated that block boundaries are not violated in merging tree 200 at any of node levels 201 through 205.

Sub-blocks 221-1 through 221-16 are respective four pixel by four pixel blocks within a 16-by-16 pixel macroblock, such as macroblock 225, in MPEG terminology. Thus, in a 16-by-16 pixel region of a frame, a search for a best fit of a four-by-four pixel may be done.

In MPEG, eight-by-eight, eight-by-sixteen, and sixteen-by-eight pixel portions of a frame are conventionally referred to as "blocks". Moreover, in MPEG, only eight-by-eight pixel blocks may be split into eight-by-four, four-by-eight, and four-by-four pixel sub-blocks. In MPEG, restrictions are placed on sets of blocks and sets of sub-blocks to all have a same size and orientation. For example, a macroblock may be organized as any one of two 16×8 blocks, two 8×16 blocks or four 8×8 blocks, but not for example one 16×8 block and two 8×8 blocks.

With respect to node levels 202 through 204 every possible combination of those blocks is illustratively shown, except for some macroblock central combinations so as not to violate block boundaries. Thus, it should be appreciated that the partitioning as described herein conforms to known standards. In MPEG, there are restrictions, such as all blocks in a macroblock are to be of identical dimensions. So, for example, a macroblock may be partitioned as one of two sixteen-by-eight blocks, two eight-by sixteen blocks, or four eight-by-eight blocks. This restriction of same dimensionality applies to blocks and sub-blocks. Thus, for example, an eight-by-eight pixel block may be partitioned as one of two eight-by-four pixel sub-blocks, two four-by-eight pixel sub-blocks, or four four-by-four pixel sub-blocks. However, these restrictions are applicable to merger of a macroblock, block or sub-block, but are not node level restrictions. Thus, a node level may be homogeneous or have a mixture of two or more types of merged blocks for example, although the output block type should have a specific form. Thus, for example, when generating an eight-by-eight block two four-by eight blocks or two eight-by-four blocks may be used. If two levels of decisions are merged into one decision level, then for example four four-by-four inputs may be used to generate an eight-by-eight block without passing to any intermediate state. This would work for any block sizes if the user does not require any intermediate data.

As previously mentioned, a search may be done for each node level to determine a best representative motion vector, which is calculated by a block-based ME search. A predictor may be used as an initial starting point for a search, and RD-cost accompanying a motion vector and motion vector predictor may be used for evaluating a search result. Thus, it should be appreciated that each sub-block, block, or macroblock as associated with node levels 201 through 205 represents a motion vector. An ME search involves obtaining a best fit motion vector, such as for example from each of node levels 201 through 205.

It shall be assumed for purposes of clarity and not limitation that even node levels of merging tree 200, namely levels 0, 2, and 4, as indicated by reference numbers 201, 203, and 205, have approximately the same level of computational complexity with respect to finding a best motion vector for each of those levels and for determining accompanying RD-costs. It shall be assumed for purposes of clarity and not limitation that the two odd node levels of merging tree 200, namely levels 1 and 3 as indicated by reference numbers 202 and 204, while having roughly equivalent computational complexity with respect to one another for finding associated best motion vectors and associated RD-costs, each have approximately twice the computation complexity of an even node level.

Decision level 211 includes rules A1 through A16. Each rule A1 through A16 is fed by two associated sub-blocks of sub-blocks 221-1 through 221-16, as generally indicated by arrows. For example, sub-blocks 221-1 and 221-2 feed rule A1 for providing block 222-1. It should be appreciated that the four-by-four pixel regions associated with sub-blocks 221-1 and 221-2 map to the four-by-eight pixel region of block 222-1. Thus, rules A1 through A16 may be used as merging rules for merging sub-blocks 221-1 through 221-16 to blocks 222-1 through 222-16.

Decision level 212 includes merging rules B1 through B4. Rule B1 for example is to check for merger of four-by-eight pixel blocks 222-1 and 222-3 to form eight-by-eight pixel block 223-1. The number of block-based searches may be reduced with each subsequent merging. More particularly, only those child blocks of a child node level usable to map or merge to a parent block of a parent node level are used. For example, either blocks 222-1 and 222-3 or blocks 222-2 and 222-4 may be used to map to block 223-1. In the example blocks 222-1 and 222-3 are used to map to block 223-1 as generally indicated by arrows, and thus motion vector block-based searches associated with blocks 222-2 and 222-4 may be omitted. Thus, it should be appreciated that effectively there has been a reduction in the number of block-based searches for determining a suitable ME vector for each of the associated node levels for node levels 202, 203, and 204.

Likewise, decision level 213 includes rules C1 through C4. Rule C1 is used to map blocks B223-1 and 223-2 to block 224-1, and rule C2 is used to map blocks 223-1 and 223-3 to block 224-2. Thus, the eight-by-eight pixel blocks of node level 203 are used to map to the eight-by-sixteen and sixteen-by-eight pixel blocks of node level 204. However, not all of the nodes of node level 204 need be used. More particularly, blocks 224-1 and 224-4 in this example are not used by rule D1 of decision level 214 for mapping to macroblock 225 of node level 205. Thus, it should be appreciated that merging tree 200 by avoiding block-based searching of redundant blocks reduces the number of motion vector searches for determining a best fit motion vector for each of node levels 202, 203, and 204 for ME.

From node level 202, only 4-by-8 pixel blocks are used for forming blocks of node level 203. However, only 8-by-4 pixel blocks from node level 202 may be used for forming blocks of node level 203. Furthermore, a combination of one or more pairs of 4-by-8 pixel blocks and one or more pairs of 8-by-4 pixel blocks from node level 202 may be used for forming blocks of node level 203. Moreover, from node level 204, only 16-by-8 pixel blocks are used for forming macroblock 225. However, only 8-by-16 pixel blocks from node level 204 may be used for macroblock 225 of node level 205.

Taking merging tree 200 a step further in reducing complexity, though with some RD performance degradation, interpolation may be added, as described below in additional detail.

In each of node levels 201 through 205 of FIG. 2A, block-based searching is done in order to select a best fit motion vector associated with each such level. Because not every possible combination is searched, namely as redundant checking for merger of pairs of blocks have been avoided, there may be some degradation in image quality, namely a small amount of degradation in RD performance. However, if a user is not able to tolerate any more degradation in RD performance than that associated with merging tree 200, it should still be appreciated that the number of block-based searches associated with obtaining best fit motion vectors for ME is reduced by using merging tree 200 of FIG. 2A. This reduction in the number searches may be a significant performance enhancement, as heretofore the complexity associated with VBS ME/MD has been in the main associated with the ME searching portion.

FIG. 2A may be considered a base operation mode, and thus operating points therefrom may be defined has having a reduction in RD performance and a reduction in complexity. However, if a user is able to tolerate further RD performance degradation, a user may select one of these other operating points as associated with FIGS. 2B through 2D to further reduce the complexity associated with the ME part of VBS ME/MD.

Figure 2B:
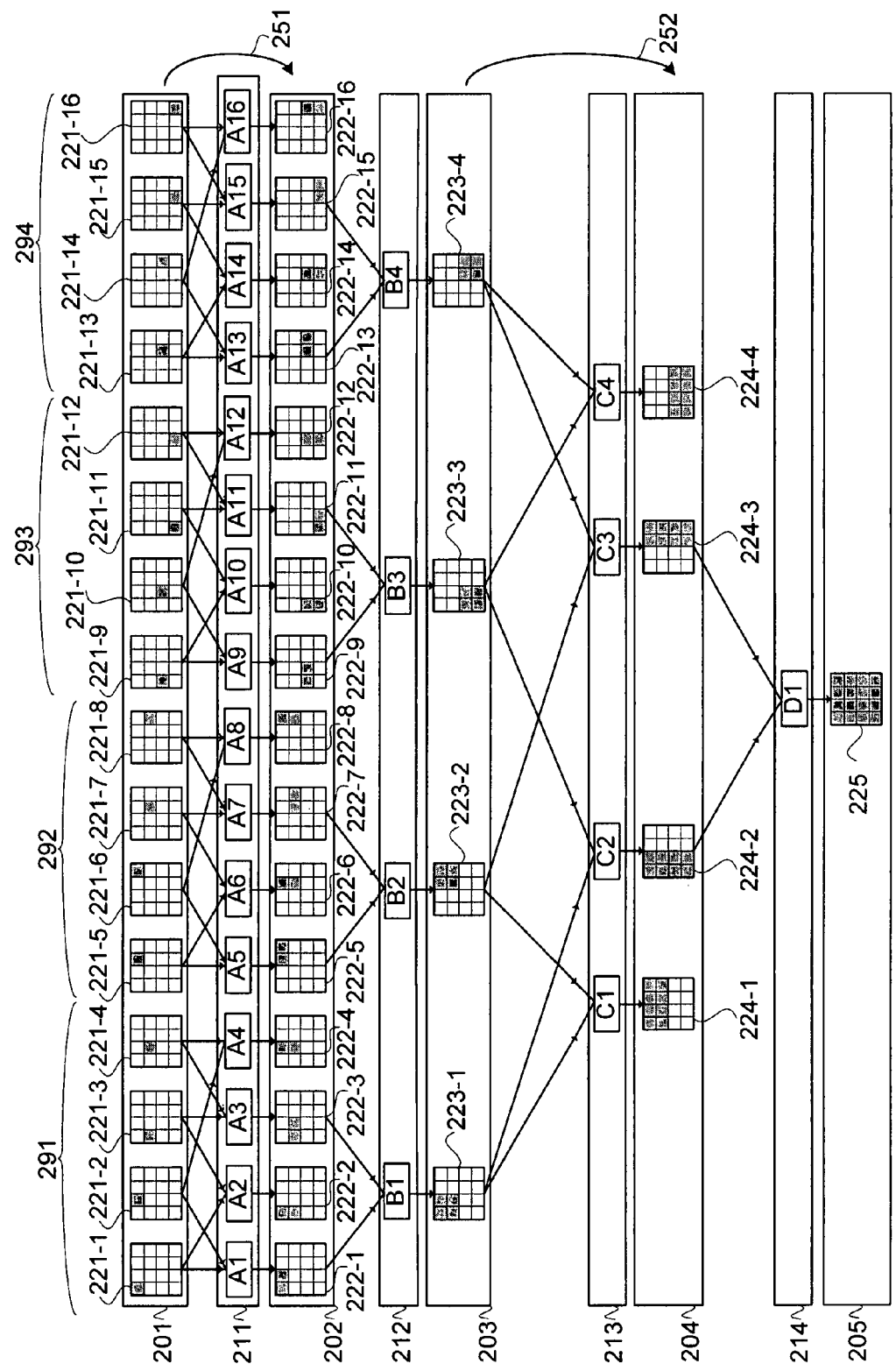

FIG. 2B is merging tree 200 of FIG. 2A for a first operating point. In FIG. 2B, node levels 201, 203, and 205 have their nodes for best fit motion vectors found by performing block-based searches as previously described. Arrows 251 and 252 indicate respective interpolations between levels. Thus, for example block-based searches are bypassed for node levels 202 and 204 by using interpolations 251 and 252, respectively, and thus decision levels 211 and 213 are bypassed by interpolations 251 and 252, respectively. Thus, node levels 202 and 204 are found by interpolating from node levels 201 and 203, respectively.

For the first operating point associated with merging tree 200 of FIG. 2B, the block-based searches are done at the four-by-four, eight-by-eight, and sixteen-by-sixteen pixel node levels, namely node levels 201, 203, and 205, respectively. The search complexity associated with this first operating point is less than the search complexity associated with searching each of levels 201 through 205 as described with reference to FIG. 2A. Thus, there is a reduction in complexity with this first operating point. To be more precise, the searches saved in this example are four-by-eight, eight-by-four, sixteen-by-eight and eight-by-sixteen pixel types of searches. Referring back to norm(x) complexity, the complexity of this example application of merging tree 200 is 3×, in comparison to the 7× complexity of the merging tree 200 of FIG. 2A. The searches performed in this example are four-by-four, eight-by-eight and sixteen-by-sixteen pixel types of searches.

Additionally, there will be accompanying reduction in RD performance. For this first operating point, motion vectors and predictors of associated modes thereof, namely four-by-eight, eight-by-four, eight-by-sixteen, and sixteen-by-eight pixel blocks, are interpolated. However, it should be appreciated that the interpolation is based on calculated motion vector data of associated child nodes in levels directly preceding the interpolated levels in merging tree 200. While not wishing to be bound by theory, it is believed that this first operating point maybe suitable for high-resolution applications along the lines of Standard Definition ("SD") and High-Definition ("HD") broadcasting.

Figure 2C:
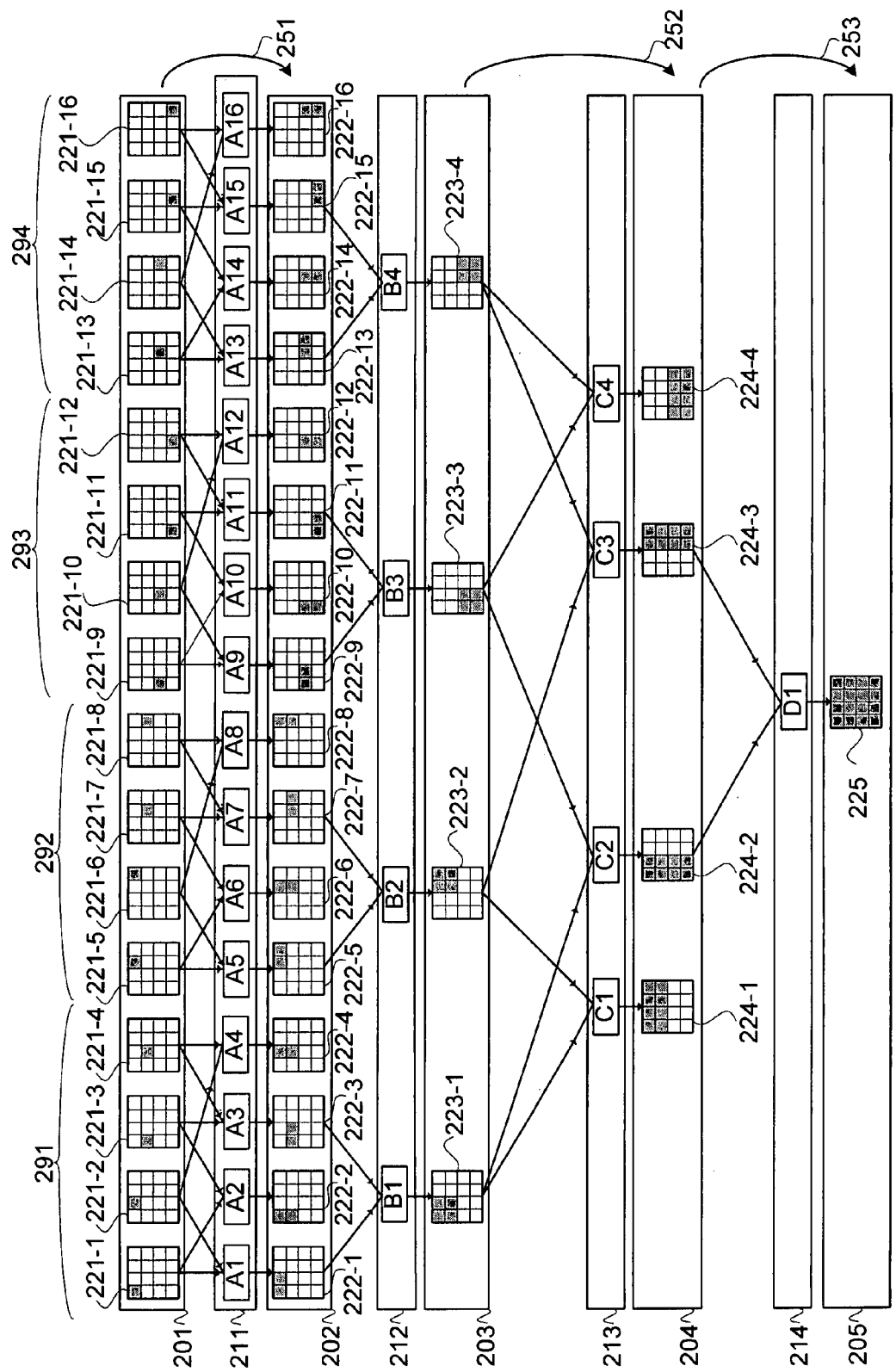

FIG. 2C is the diagram of FIG. 2B, except that node level 205 is obtained by interpolation as indicated by arrow 253. Thus, merging tree 200 of FIG. 2C indicates a second operating point. In this second mode of operation, only four-by-four and eight-by-eight pixel types of block-based searches are done, which a further reduction in complexity from the block-based searches described with reference to FIG. 2B for example. However, motion vectors and predictors of associated modes thereof, namely four-by-eight, eight-by-four, eight-by-sixteen, and sixteen-by-eight, and sixteen-by-sixteen pixel modes, are in interpolated using the tree structure of merging tree 200. Thus, as previously described, node levels 202 and 204 are obtained by interpolation, as indicated respectively by arrows 251 and 252. Additionally, node level 205 is obtained by interpolation from node level 252, as generally indicated by arrow 253.

It should be appreciated that node level 205 in FIG. 2C is obtained from an interpolated node level 204 directly preceding node level 205. This is in contrast to FIG. 2B where each of the interpolated levels, namely node levels 202 and 204 is obtained from a preceding block-based search obtained node level. Again, while not wishing to be bound by theory, it is believed that the second operating point or second may be suitable for applications involving a relatively high degree of RD performance but with more emphasis on a reduction in complexity as compared for example with the first operating mode associated with FIG. 2B.

Figure 2D:
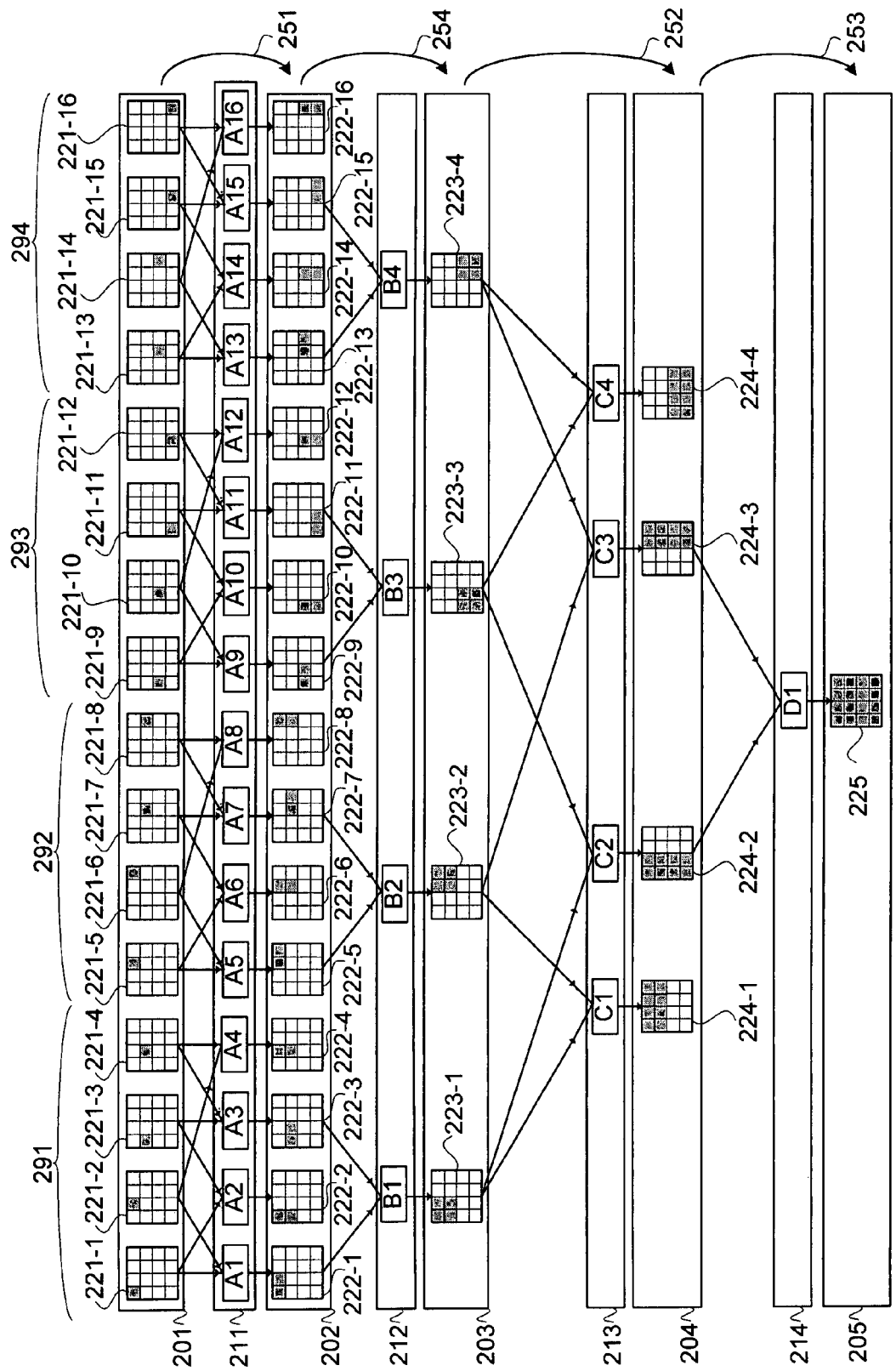

FIG. 2D is the merging tree 200 of FIG. 2C, but with an additional interpolation as generally indicated by arrow 254. More particularly, in contrast to the block-based search of node level 203 of the second operating point mode of FIG. 2C, the third operating point mode of operation of FIG. 2D uses an interpolation for obtaining node level 203. It should be appreciated that operating point three, while having the least RD performance as compared to the other operating points illustratively shown with reference to FIGS. 2B and 2C for example, also has the least amount of complexity. Accordingly, for applications where a reduction in power consumption may be desirable, operating point three may be employed. Additionally, operating point three may be used in applications such as surveillance or video conferencing, where image quality loss may be tolerated or compensated with additional bandwidth. In operating point three, block-based searches are only done on the four-by-four pixel level, namely node level 201, while motion vectors and predictors of all other modes, namely for four-by-eight, eight-by-four, eight-by-eight, eight-by-sixteen, sixteen-by-eight, and sixteen-by-sixteen pixels are interpolated starting with node level 202 and successively progressing through to node level 205.

As previously described, even node levels have less complexity than odd node levels. By generally assigned a 1× complexity to each even node level and a 2× complexity to each odd node level as previously assumed, a general indicator with respect to the degree of computational complexity of each merging tree may be expressed. Operating point one would thus have a search complexity of 3×. A search complexity of 3× is approximately less than half the search complexity of doing all block-based searches as in FIG. 2A. Likewise, operating points two and three may be generally characterized as having VBS 2× and VBS 1× search complexities, respectively.

Without wishing to be bound by theory, it is believed that the operating point merging tree 200 of FIG. 2A may have approximately the same performance as doing a complete block-based exhaustive search as in the above-referenced conventional JM implementation. Along those lines, while not wishing to be bound by theory, it is believed that operating points one and two may be reasonably close in terms of RD performance to a complete block-based exhaustive search as in the above-referenced conventional JM implementation. With respect to operating point three, again while not wishing to be bound by theory, it is believed that operating point three will outperform a version of the above referenced JM implementation in which all searches and all other modes are turned off other than the four-by-four pixel search and associated mode.

The VBS 1×, 2×, and 3× MDs may be derived assuming that each merging rule involves a single comparison. Thus, for VBS 3×, namely operating point one, there may be 26 comparisons to go along with the three node level motion vector searches, and additionally, 18 additions for MDs. For VBS 2×, in addition to the two node level motion vector searches, there are 25 comparisons and 12 additions for MDs. Lastly, for VBS 1×, namely operating point three, in addition to the 1× search complexity for motion vector searching there are 25 comparisons for MDs. These complexities for MD, do not include control logic. Additionally, for MD complexity associated with VBS 2× and 3×, additions and comparisons for early mode skipping is included. These are just some possible examples, and other example implementations may be used.

Decision levels 211 through 214 are for respective merging rules. It should be appreciated that two sub-blocks or blocks sometimes may not be merged. Whether sub-blocks for example are merged is determined by a decision function. One parameter of the decision function is cost. Another parameter of the decision function is the difference between the MVs, or sub-blocks. For example, if the motion in the video is relatively high, better quality may be obtained by not merging sub-blocks but by leaving them separated. Thus for example, blocks on node level 202 for example in some instances cannot be merged with one another to form a block on node level 203. Thus, it is possible that there exists a combination of one or more blocks capable of being merged and one or more blocks not capable of being merged on the same node level. Therefore some branches of merging tree 200 may be stopped at a node level where other branches are not stopped at that node level. In order to know whether progression may go from one level to another, a cost analysis may be done.

Figure 3:
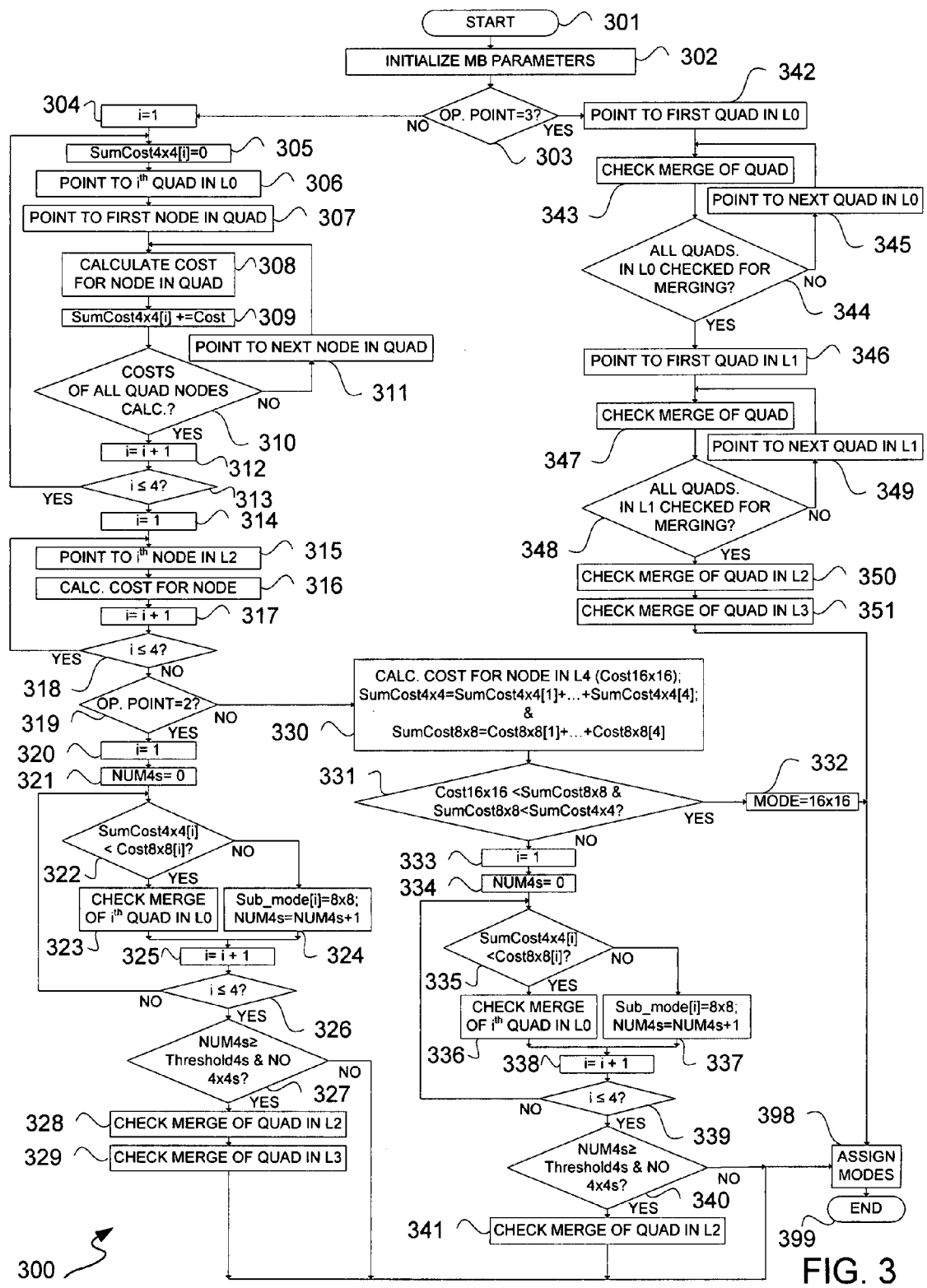
FIG. 3 is a flow diagram depicting an exemplary embodiment of a merging and Mode Decision ("MD") flow 300.

FIG. 3 is a flow diagram depicting an exemplary embodiment of a VBS ME/MD flow 300 for merging tree 200 of FIGS. 2B through 2D. At 301, flow 300 is begun, and at 302 macroblock ("MB") parameters are initialized. At 303 it is determined whether the operating point mode is set equal to three. If the operating point is set equal to three, the operating mode as illustratively shown in FIG. 2D is set.

Assuming a user has not selected operating point three, a counter variable, i, is set equal to 1. In this example, this counter variable may range from 1 to 4. Thus, at 304, counter variable, i, may be initialized to equal one. At 305 a total cost of four-by-four sub-blocks 221-1 through 221-16 may be initialized. At 306, an ith quad, such as quad 291 made up of sub-blocks 221-1 through 221-4, in node level 201 may be obtained. At 307, the first node in the quad obtained 306 may be pointed to, such as for example sub-block 221-1.

At 308, the cost for the node obtained at 307 may be determined. At 309, the cost determined at 308 is accumulated. At 310 it is determined whether costs of all nodes in a quad have been determined, namely for this example nodes 221-1 through 221-4. If it is determined at 310 that costs of all nodes in a quad have not been determined, then at 311 a next node in a quad is obtained, and steps 308 and 309 are repeated.

If however, it is determined at 310 that costs of all nodes in a quad have been determined, then at 312 counter variable i is incremented by one. At 313, it is determined whether counter variable i is less than or equal to four. If counter variable i is less than or equal to four, processing of another quad is initiated again at 305. The first quad 291 in this example is formed of sub-blocks 221-1 through 221-4. The second quad 292 is formed of sub-blocks 221-5 through 221-8. The third quad 293 is formed of sub-blocks 221-9 through 221-12, and the fourth quad 294 is formed of sub-blocks 221-13 through 221-16. Thus, it should be appreciated that for this example operations 304 through 313 are for determining cost associated with four-by-four pixel sub-blocks of node level 201 based on groupings of four nodes. In this manner, each quad, and each node within each quad, may be successively processed.

Once counter variable i is greater than four as determined at 313, counter variable i is reset to equal to one at 314. For all operating modes associated with FIGS. 2A through 2D a block-based search is done with respect to node level 201. Thus, each of these operating modes may share cost determinations associated with operations 304 through 313.

After counter variable i is reinitialized to equal one at 314, at 315 an ith node, which is initially may be a first node, in node level 203 is obtained. It should be appreciated then that in each of the operating modes, as illustratively shown with respect to FIGS. 2B through 2D, block-based searching of node level 202 is bypassed by interpolation, as generally indicated by arrow 251. At 316, cost for the node in level 203 obtained at 315 is determined. At 317 counter variable i is incremented by one. At 318 it is determined whether counter variable i is less or equal to four. If counter variable i is less than or equal to four, a next node in node level 203 is obtained at 315 and operations 316 and 317, as well as 318, are repeated, until counter variable i is greater than four.

When counter variable i is greater than four as determined at 318, it is determined at 319 whether operating point two was selected by a user. If operating point two was selected as determined at 319, then at 320 counter variable i is reset to equal to one. At 321, the number of fours ("NUM4s") is set equal to zero. The NUM4s is a counter for counting 8-by-8 blocks.

At 322, it is determined the sum or total cost of four-by-four pixel sub-blocks for an ith quad is less than the cost of an associated ith eight-by-eight pixel block, namely a grandparent block to the ith quad. If the total cost of the four-by-four pixel sub-blocks is less than the total cost of eight-by-eight pixel block as determined at 322, then at 323 a check for the merging of the ith quad from node level 201 is performed. If, however, at 322 it is determined that the sum four-by-four cost for the ith quad is not less than the total cost of the eight-by-eight block corresponding thereto, then at 324 the ith sub-mode is set equal to an eight-by-eight mode, and NUM4s is set equal to the NUM4s plus one, namely NUM4s is incremented by one.

In other words, if operating point two is selected, the sum of costs of each of four neighboring four-by-four nodes, such as four-by-four nodes or sub-blocks 221-1 through 221-4 which form a quad 291 of node level 201, is compared with a cost for a corresponding eight-by-eight block of node level 203, such as eight-by-eight block 223-1. This is to decide whether to start with four-by-four quads followed by merge checking for one level up, or to start with an eight-by-eight block on level 203 followed by merge checking for two levels up.

At 325, counter variable i is incremented by one, and at 326 it is determined whether counter variable i is less than or equal to four. If counter variable i is less than or equal to four, operation 322 is repeated until all quad costs of quads 291 through 294 of node level 201 have been respectively compared with all associated costs of corresponding blocks 223-1 through 223-4.

If at 326 it is determined that counter variable i is greater than four, then at 327 it is determined whether NUM4s is greater than or equal to a threshold for the number of 4s ("Threshold4s"), namely a predetermined threshold number of 8-by-8 blocks sufficient in number to perform a merge. If the NUM4s is not greater than or equal to Threshold4s as determined at 327, then modes are assigned at 398. If, however, at 327 it is determined that NUM4s is greater than or equal to Threshold4s, then at 327 it is additionally determined whether there are no 4-by-4 sub-blocks. If there are one or more 4-by-4 sub-blocks as determined at 327, then modes are assigned at 398. The order of these two determinations at 327 may be reversed.

If, however, at 327, it is determined that NUM4s is greater than or equal to Threshold4s and there are no 4-by-4 pixel sub-blocks, then at 328 a check for merging of a quad in node level 203, namely blocks 223-1 through 223-4, is performed at 328, and at 329 a check for merging a quad in node level 204, namely either blocks 224-1 and 224-4 or blocks 224-2 and 224-3, is performed. After the operation at 329, one or more modes are assigned at 398.

If, however, it is determined at 319 that operating point two is not selected, then at 330 the cost for the macroblock 225 of node level 205 is determined. This is the cost of a sixteen-by-sixteen pixel macroblock. Additionally, at 319 the total cost of all four eight-by-eight pixel blocks, the cost for each of which is individually determined at 316 and may be stored for summing at 330, is determined. Additionally, at 330, the total of costs of each node level 201 quad, such as quads 291 through 294, is determined. The cost for each of node level 201 quad is individually determined at 309 and may be stored for summing at 330.

At 331, it is determined whether the cost for macroblock 225 is less than the sum cost of all eight-by-eight pixel blocks and whether the sum cost of all eight-by-eights pixel blocks is less than the sum cost of all four-by-four quads. If both of these inequalities are true as determined at 321, then at 332 the mode is set as equal to a sixteen-by-sixteen mode, and one or more modes are assigned at 398. If both inequalities or one or more of the inequalities at 331 is false, then at 333 counter variable i is set equal to one. Operations 333 through 341 respectively correspond to operations 320 through 328. Accordingly, for purposes of clarity, a description of these corresponding operations is not repeated. Thus, it should be appreciated that flow 300 may be enhanced to remove this redundancy, which is illustratively shown in FIG. 3 for purposes of more completely describing each branch of flow 300. After the check for merging of a quad formed of four eight-by-eight blocks in node level 203 is done at 341, one or more modes are assigned at 398.

If, however, it is determined at 303 that operating point three has been selected, then at 342 a first quad in node level 201 is obtained. At 343, a check for merging of the quad obtained at 342 is done. At 344 it is determined whether all four quads in node level 201 have been check for merging. If not all four quads in node level 201 have been checked for merging, then at 345 a next quad in node level 201 is obtained and operations 343 and 344 are repeated. If, however, at 344 it is determined that all four quads in node level 201 have been checked for merging, then at 346 a first quad in node level 202 is obtained.

A quad in node level 202 may be formed of pairs of 4-by-8 pixel blocks 222-1, 222-3, 222-5, 222-7, 222-9, 222-11, 222-13, and 222-15, or pairs of 8-by-4 pixel blocks 222-2, 222-4, 222-6, 222-8, 222-10, 222-12, 222-14, and 222-16, or a combination thereof. For example, one such quad may be formed of blocks 222-1 and 222-3 and another such quad may be formed of blocks 222-5 and 222-7. Or, for example, one such quad may be formed of blocks 222-2 and 222-4 and another such quad may be formed of blocks 222-6 and 222-8. Alternatively, for example, such quad may be formed of blocks 222-1 and 222-3 and another such quad may be formed of blocks 222-6 and 222-8.

At 347 at check for merging of the quad obtained at 346 is performed. At 348, it is determined whether all four quads in node level 202 have been checked for merging. If all four quads of node level 202 have not been checked for merging, a next quad from node level 202 is obtained at 349, and operations 347 and 348 are repeated. If, however, at 348 it is determined that all four quads in node level 202 have been checked for merging, then a check for merging of the quad of node level 203 is done at 350 and check for merging of a quad of node level 204 is done at 351. Operations 350 and 351 are repeats of operations 328 and 329. After operation 351 one or more modes are assigned at 398. After assigning modes at 398, flow 300 ends at 399.

Again, it should be appreciated that some operations are indicated as being repeated in multiple instances for purposes of clarity. However, it should be appreciated that flow 300 may be optimized by avoiding multiple instantiations of some repeated operations.

It should be appreciated that at operating point three, the structure of merging tree 200 is parsed, namely checked for merging, starting from node level 201 and preceding all the way to node level 205. Operating point one differs from operating point two by having an additional check for a possible early decision to choose a sixteen-by-sixteen mode, namely as indicated at operation 332. This makes the last merge-checking stage unnecessary. It is assumed that node costs are calculated on demand. However, node costs may be predetermined and passed as inputs to a VBS module. For example, node costs may have already been calculated during the searching for best motion vectors.

Different merging rules than those described herein may be used for checking for merging of different nodes. However, the complexity associated with the type of rules employed is influential in determining the complexity of a VBS ME/MD module. Accordingly, for simplicity, the same merging rule is initially presumed to be applicable for all pairs of blocks as applied herein. Other varieties of merging rules may be used, such as changing the merging rule according to the level it is associated with, or giving some nodes more priority than others, or a combination thereof. For example, nodes with higher priority may be subjected to more accurate merging rules.

Figure 4:
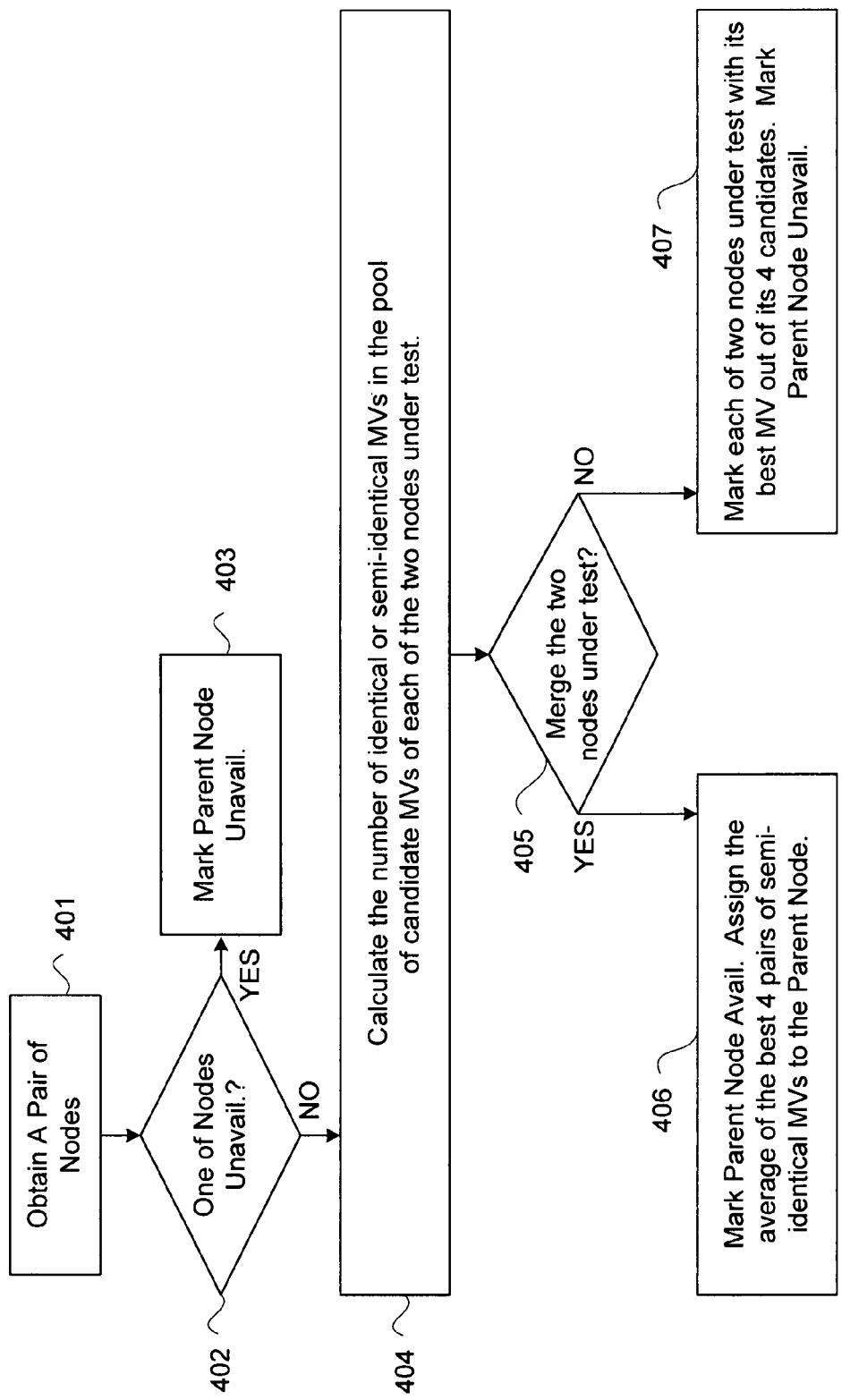
FIG. 4 is a flow diagram depicting an exemplary embodiment of a merge-checking rule.

FIG. 4 is a flow diagram depicting an exemplary embodiment of a merge-checking rule flow 400. At 401, a pair of nodes of a level are obtained. At 402 it is determined whether one or more of the nodes obtained is unavailable. If one or more of the nodes are unavailable, then the associated parent node, or parent nodes of those unavailable nodes, are marked as unavailable at 403. If all of the nodes obtained at 401 are available as determined at 402, then the number of identical or semi-identical motion vectors in a pool of candidates of motion vectors of each of the nodes under test is determined at 404. As indicated in FIGS. 2A through 2D by arrows from nodes to rules, nodes are tested in pairs. Thus for example, for four-by-four pixel sub-blocks, there are sixteen pairs of motion vectors for comparing.

Figures 5, 6, 7:
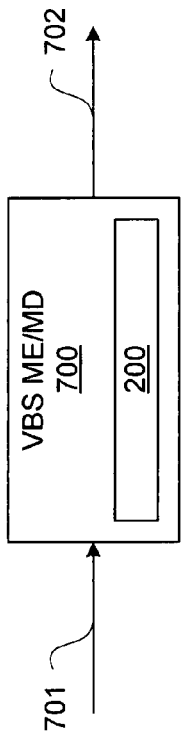
FIG. 5 is a pseudo-code listing depicting an exemplary embodiment of an identification rule which may be used to identify semi-identical motion vectors.
FIG. 6 is a pseudo-code listing depicting an exemplary embodiment of a merger rule.
FIG. 7 is a block diagram depicting an exemplary embodiment of a Variable Block Size ("VBS") Motion Estimation ("ME") and Mode Decision ("MD") module.

FIG. 5 is a pseudo-code listing depicting an exemplary embodiment of a rule 500 which may be used to identify semi-identical motion vectors. The delta for x and y components of motion vectors are respectively determined at 501 and 502. The semi-identical motion vector variable is initialized to zero at 503. If the x motion vector delta is less than or equal to a threshold value for x and the y motion vector delta is less than or equal to a threshold value for y, then the motion vectors may be merged as generally indicated at 504, namely the two motion vectors are determined to be semi-identical. If however, either or both of the inequalities at 505 are not true, then the two motion vectors being tested for being merged may not be merged as generally indicated at 506. As generally indicated at 507, the operations associated with rule 500 may be repeated to count the number of semi-identical motion vectors pairs tested for testing all motion vector pairs to be tested.

Returning to FIG. 4, if it is determined at 405 that two nodes under test may be merged, then at 406 a parent node of the two nodes under test is marked as available and the average of the best four pairs of semi-identical motion vectors ("MVs") identified may be assigned to the parent node. This may be used to decide if this parent node is to be merged with its neighbor next level node or not. If, however, at 405 it is determined that the two nodes under test may not be merged, then at 407 each of such two nodes under test are marked with their best respective motion vector out of the four candidates and the parent node is marked as unavailable.

With respect to determining whether to merge two nodes under test, FIG. 6 is a code listing depicting an exemplary embodiment of a merger rule 600. In this example, if a quantization parameter ("QP") is within any one of three ranges as respectively indicated at 601 through 603, then one of the three associated merging rules is used. If the quantization parameter is not within any of the three ranges, then at 604 a different merging rule is used.

It should be appreciated that the pseudo-code illustratively shown in FIGS. 5 and 6, as well as the flow of FIG. 4, is based on the assumption that each search node has been searched using different motion vectors predictors. More particularly, it has been assumed that each searched node has been searched using four different motion vector predictors. For example, N_MV in pseudo-code may be assumed to be 4 for example. This means that each search node may be initially marked by its four best motion vectors and four motion vector predictors, which may help avoiding falling into a local minima. For simplification, all testing results may be generated assigning N_MV equal to 1. Thus, it should be appreciated that numbers other than 4 candidates may be used. Moreover, Th_x and Th_y may be set equal to one another, and either or both may be set equal to zero for example or some other value greater than zero.

FIG. 7 is a block diagram depicting an exemplary embodiment of a VBS ME/MD module 700. VBS ME/MD module 700 may be implemented in hardware or in software, or a combination thereof, to include a merging tree 200. Thus, input data 701 may be provided to module 700 for VBS ME/MD. Module 700 with use of merging tree 200 may provide encoded output data 702.

Any of three operating points, where at least one interpolation is used as previously described with reference to FIGS. 2B through 2D, may be used. These operating points introduce optimizations over use of any a variety of JM implementations. Moreover, a complete JM implementation, while out performing for example either operating point two or three, may still not out perform either of those operating points by more than approximately 0.2 dB at any bit rate approximate to a target bit rate suitable for a sequence of images. This may make subjective quality difference of a reconstructed sequence using operating point two for example, or even operating point three for example, practically almost unrecognizable by many humans with respect to those reconstructed by a conventional exhaustive search using the JM software.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A system comprising:
an encoder; and
a memory coupled to the encoder, the memory storing a data structure, the data structure comprising:
N node levels for N a positive integer greater than two;
N–1 decision levels being respectively interspersed between the node levels;
the decision levels and the node levels having a hierarchical arrangement;
a first node level of the node levels having first nodes and being a lowermost node level;
the first nodes mapping an area divided up into M for M a positive integer equal to a number of the first nodes, wherein the first nodes are capable of mapping the area once over;
first pairs of the first nodes respectively provided as input to first rules, the first rules being of a first decision level of the decision levels;
a second node level of the node levels having second nodes, the second nodes being formed by respectively merging the first nodes of the first pairs responsive to the first rules;
second pairs of the second nodes respectively provided as input to second rules, the second pairs capable of mapping the area once over, the second rules being of a second decision level of the decision levels, the second pairs being formed of a subset of all possible ones of the second nodes for being capable of mapping the area once over;
the second pairs being one quarter as many as the first pairs;
a third node level of the node levels having third nodes; the third nodes being formed by respectively merging the second nodes of the second pairs responsive to the second rules; and
the third nodes capable of mapping the area once over.

2. The system according to claim 1, the data structure further comprising:
third pairs of the third nodes respectively provided as input to third rules, the third rules being of a third decision level of the decision levels;
the third pairs being equal in number to the second pairs;
a fourth node level of the node levels having fourth nodes, the fourth nodes being formed by respectively merging the third nodes of the third pairs responsive to the third rules;
a pair of the fourth nodes provided as input to a final rule, the final rule being of a fourth decision level of the decision levels, the pair of the fourth nodes being formed of a subset of all possible ones of the fourth nodes for being capable of mapping the area once over;
the pair being one quarter as many as the third pairs;
a fifth node level of the node levels having a final node, the final node being formed by merging the fourth nodes of the pair responsive to the final rule; and
the final node capable of mapping the area once over.

3. The system according to claim 2, wherein each pair of the second pairs of the second nodes have a same first orientation; and wherein each pair of the fourth pairs of the fourth nodes have a same second orientation.

4. The system according to claim 2, wherein the second nodes used for forming the second pairs all have a same first orientation; and wherein the fourth nodes used for forming the final pair have a same second orientation.

5. The system according to claim 2, wherein:
the first nodes are 4-by-4 pixel nodes;
the second nodes are 4-by-8 pixel and 8-by-4 pixel nodes;
the third nodes are 8-by-8 pixel nodes;
the fourth nodes are 8-by-16 pixel and 16-by-8 pixel nodes; and
the final node is a 16-by-16 pixel node.

6. The system according to claim 2, wherein the encoder is configured for:
selecting among modes of operation; and
responsive to a selected mode of the modes of operation, either block-based searching each of the node levels or block-based searching only the first node level and either interpolating or block-based searching each of the second node level, the third node level, the fourth node level, and the fifth node level.

7. The system according to claim 2, wherein the encoder is configured for:
selecting among modes of operation; and
responsive to a selected mode of the modes of operation, block-based searching only the first node level and either interpolating or block-based searching each of the second node level, the third node level, the fourth node level, and the fifth node level.

8. The system according to claim 2, wherein the encoder is configured for:
selecting a mode of operation;
block-based searching the first node level; and
interpolating each of the second node level, the third node level, the fourth node level, and the fifth node level.

9. The system according to claim 2, wherein the encoder is configured for:
selecting a mode of operation; and
block-based searching each of the first node level and the third node level; and
interpolating each of the second node level, the fourth node level, and the fifth node level.

10. The system according to claim 2, wherein the encoder is configured for:
selecting a mode of operation; and
block-based searching each of the first node level, the third node level, and the fifth node level; and
interpolating each of the second node level and the fourth node level.

11. The system according to claim 2, wherein block-based boundaries are not violated at any of the node levels; and wherein the node levels are levels of motion vectors.

12. A method for encoding video information, comprising:
initializing macroblock parameters;
determining, using a processor, if a first operating point is selected; and
if the first operating point is selected, then performing the following checks for merging nodes in a set of multi-level nodes:
first checking each quad of nodes of a first node level of the multi-level nodes for merger;
second checking each quad of nodes of a second node level of the multi-level nodes for merger;

third checking of nodes of a third node level of the multi-level nodes for merger;

fourth checking of nodes of a fourth node level of the multi-level nodes for merger; and assigning modes responsive to cost of combinations of encoding modes associated with possible mergers identified at one or more of the first checking, the second checking, the third checking, and the fourth checking.

13. The method according to claim 12, further comprising:
if the first operating point is not selected, then:
obtaining each of the quad of nodes of the first node level;
for each of the quad of nodes obtained from the first node level,
obtaining each of the nodes of the quad of nodes obtained;
determining a cost for each of the nodes of the quad of nodes obtained;
accumulating the cost for each of the nodes to provide sum costs associated with each of the quad of nodes obtained from the first node level;
obtaining the nodes of the third node level;
for the nodes obtained from the third node level, determining a cost for each of the nodes obtained;
determining if a second operating point is selected;
if the second operating point is not selected, then block-based searching is performed on at least the first node level, the third node level, and the fifth node level: and
if the second operating point is selected, then block-based searching is performed on the first node level and the third node level.

14. The method according to claim 13, wherein the first node level is a 4-by-4 pixel node level; wherein the second node level is a 4-by-8 pixel and an 8-by-4 pixel node level; wherein the third node level is an 8-by-8 pixel node level; wherein the fourth node level is an 8-by-16 pixel and a 16-by-8 pixel node level; and wherein the fifth node level is a 16-by-16 pixel node level.

15. The method according to claim 13, wherein the first operating point is for block-based searching of the first node level and for interpolation of each of the second node level, the third node level, the fourth node level, and the fifth node level.

16. The method according to claim 15, wherein the second operating point is for interpolation of each of the second node level, the fourth node level, and the fifth node level.

17. The method according to claim 13, wherein the method is implemented in a variable block size motion estimation/mode decision module located in a programmable logic device, the module being coupled to receive input image data and configured to provide output image data, the output image data being encoded using the variable block size motion estimation/mode decision module.

18. The method according to claim 12, wherein the first checking for merger each of the quad of nodes obtained from the first node level includes:

determining if at least one node from two nodes of the quad of nodes obtained from the first node level is unavailable;
if the at least one node is unavailable, then marking a parent node of the two nodes as unavailable, the parent node being of the second node level;
if, however, both of the two nodes are available, then:
determining a number of at least semi-identical motion vectors in a pool of candidates of motion vectors of each of the two nodes;
deciding whether the two nodes are subject to being merged;
if the two nodes are subject to being merged, then:
marking the parent node as available;
determining an average of a first portion of the number of at least semi-identical motion vectors; and
assigning the average to the parent node;
if the two nodes are not subject to being merged, then:
marking each of the two nodes with a portion of the pool of candidates of motion vectors; and
marking the parent node as unavailable.

19. The method according to claim 18, wherein the determining the number of at least semi-identical motion vectors includes:
approximating an x-direction motion vector absolute value between two motion vectors;
approximating a y-direction motion vector absolute value between the two motion vectors;
deciding if both the x-direction motion vector absolute value and the y-direction motion vector absolute value are less than or equal to an x-threshold value and a y-threshold value, respectively;
if both the x-direction motion vector absolute value and the y-direction motion vector absolute value are less than or equal to the x-threshold value and the y-threshold value, respectively, then assigning the two motion vectors as being at least semi-identical motion vectors; and
if either or both the x-direction motion vector absolute value and the y-direction motion vector absolute value are not less than or equal to the x-threshold value and the y-threshold value, respectively, then not assigning the two motion vectors as being at least semi-identical motion vectors.

20. The method according to claim 18, wherein the deciding whether the two nodes are subject to being merged includes:
obtaining a threshold;
determining which range among a plurality of ranges the threshold is in;
responsive to the number of at least semi-identical motion vectors being sufficient for merger as associated with the range, determining that the two nodes are subject to being merged; and
responsive to the number of at least semi-identical motion vectors not being sufficient for merger as associated with the range, determining that the two nodes are not subject to being merged.

* * * * *